US008417122B2

(12) United States Patent  (10) Patent No.: US 8,417,122 B2
Kim et al.  (45) Date of Patent: Apr. 9, 2013

(54) APPARATUS FOR VISIBLE LIGHT COMMUNICATION INDICATING COMMUNICATION QUALITY USING RGB COLOR MIXING AND METHOD THEREOF

(75) Inventors: Dae-Ho Kim, Daejeon (KR); Tae-Gyu Kang, Daejeon (KR); Sang-Kyu Lim, Daejeon (KR); Il-Soon Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 293 days.

(21) Appl. No.: 12/846,359

(22) Filed: Jul. 29, 2010

(65) Prior Publication Data

US 2011/0026918 A1  Feb. 3, 2011

(30) Foreign Application Priority Data

Aug. 3, 2009 (KR) ........................ 10-2009-0071288
Feb. 12, 2010 (KR) ........................ 10-2010-0013304

(51) Int. Cl.
*H04B 10/00* (2006.01)
(52) U.S. Cl. ...................................... 398/130; 398/128
(58) Field of Classification Search .................. 398/128, 398/130
See application file for complete search history.

(56) References Cited

U.S. PATENT DOCUMENTS 5,371,623 A * 12/1994 Eastmond et al. ............. 398/27
2005/0058091 A1   3/2005 Rudd et al.
2008/0094244 A1 * 4/2008 Oh et al. .................. 340/815.45

FOREIGN PATENT DOCUMENTS

| JP | 2007-180826 | 7/2007 |
| KR | 10-0770918 | 10/2007 |
| KR | 10-2009-0005794 | 1/2009 |
| KR | 10-2009-0011203 | 2/2009 |

OTHER PUBLICATIONS

U.S. Patent Office Action mailed Jul. 23, 2012 in co-pending U.S. Appl. No. 12/846,351.

* cited by examiner

*Primary Examiner* — Nathan Curs
(74) *Attorney, Agent, or Firm* — Staas & Halsey LLP (57) ABSTRACT

A visible light communication apparatus of the present invention includes: a target signal receiver filtering only a signal having a target wavelength from a visible light received signal received from a transmitting terminal; a signal generator judging a reception quality of the visible light received signal by using characteristics of the signal having the target wavelength and generating a visible signal by using at least one light source having a wavelength different from the target wavelength in accordance with the reception quality; and an optical signal transmitter transmitting the signal having the target wavelength for transmitting data together with the visible signal and changing a light emitting color of a visible light transmitted signal.

16 Claims, 4 Drawing Sheets

APPARATUS FOR VISIBLE LIGHT COMMUNICATION INDICATING COMMUNICATION QUALITY USING RGB COLOR MIXING AND METHOD THEREOF

CROSS REFERENCE TO RELATED APPLICATIONS

This application claims priority to Korean Patent Application No. 10-2009-0071288 filed on Aug. 3, 2009 and Korean Patent Application No. 10-2010-0013304 filed on Feb. 12, 2010, the entire contents of which are herein incorporated by reference.

BACKGROUND OF THE INVENTION

1. Field of the Invention

The present invention relates to an apparatus for a visible light communication indicating a communication quality using RGB color mixing and a method thereof. More particularly, the present invention relates to an apparatus for a visible light communication and a method thereof that allows a user to verify a communication quality by changing a light emitting color depending on a reception quality of a visible light received signal received from a transmitting terminal.

2. Description of the Related Art

Visible light is light having a wavelength in a range that is visible to the human eye among electromagnetic waves and the wavelength of the visible light is in the range of 380 to 780 nm. In the visible light, a change in property depending on the wavelength is indicated by colors and the wavelength becomes shorter from a red color to a purple color. Light having a wavelength longer than the red color is referred to as infrared rays and light having a wavelength shorter than the purple color is referred to as ultraviolet rays. Monochromic light emits specific wavelengths ranges for each color, for example, the red color emits between 610 to 700 nm, an orange color emits between 590 to 610 nm, a yellow color emits between 570 to 590, a green color emits between 500 to 570 nm, a blue color emits between 450 to 500 nm, and the purple color emits between 400 to 450. When the colors of the wavelengths are mixed, various colors are seen to the human eye.

A communication technology using light in a communication area includes an infrared-ray data wireless communication (IrDA) using an infrared-ray area, a visible light wireless communication using visible light, an optical communication using an optical fiber, etc. In the visible light wireless communication using the visible light, a user can, in person, verify a signal for transferring communication data with his/her eyes unlike other wireless communications in respect to using the visible light.

The infrared data association (IrDA) is a private standard organization founded in 1993 to establish the specification of the infrared data communication, but, in general, it often represents the communication specification established by the IrDA. Main specifications used in a PC include IrDA1.0 having the maximum data transmission rate of 2.4 to 115 kbps and IrDA1.1 having the maximum data transmission rate of 1152 Mbps. The Infrared communication is a technology performing a communication by using an infrared-ray area having a wavelength of 850 to 900 nm described above.

Visible light wireless communication as a communication technology using a wavelength in the range of 380 to 780 nm is being standardized by the Study Group of the IEEE 802.15 WPAN (wireless personal area network) and in Korea, a visible light wireless communications task force of the Telecommunications Technology Association (TTA) is in operation.

Korean Registered Patent No. 10-0770918 discloses "Apparatus and Method of Controlling Visible Light Color Emitted depending on Current State in Visible Light Communication Device". The above registered patent discloses a method of allowing a user to intuitively verify a current communication state by storing information for outputting a light emitting color for indicating communication states to correspond to at least one communication state and after verifying a current communication state and a light emitting color depending on the current communication state and a color of a visible light signal emitted for communication in selecting a visible light communication mode, emitting the color of a visible light signal emitted for a communication as the verified light emitting color. The registered patent divides 'the communication state' into a communication link setting state, a data transmission state, a communication link out-of-range state and emits a first color, a second color, or a third color set for each communication state.

Further, Korean Unexamined Publication No. 10-2009-0005794 discloses "Method and Apparatus of Generating Visible Signal for Data Transmission Frame in Visible Light Communication System". The unexamined publication discloses a method and an apparatus of generating a visible signal for a data transmission frame in a visible light communication system that includes a step of receiving predetermined data constituted by a plurality of frames from a transmitting side, a step of checking and converting a signal having a received signal strength indication (RSSI) measured from the transmitting side, verifying the converted RSSI, a step of determining a level of a visible signal indicated by visible light by differentiating the state of a corresponding communication channel for each frame and transmitting the determined level to the transmitting side every time the frames of the predetermined data are sequentially received, and a step of when reception of the predetermined data is completed, transmitting a corresponding response message to the transmitting side depending on success or not in receiving the received predetermined data. The unexamined publication discloses a method of changing a lighting speed and a color of a signal by using the data transmission frame according to a judgment of the RSSI signal measured at the transmitting side.

However, the prior arts do not provide a method of allowing a user to intuitively verify a reception quality of data transmitted through a visible light signal by checking for an occurrence of an error in a packet received from a transmitting terminal, and emitting and expressing the occurrence of the error with various colors through a combination of RGB colors.

SUMMARY OF THE INVENTION

The present invention is contrived to solve the problems. An object of the present invention is to provide a method and a visible light communication apparatus that allow a user to intuitively verify a reception quality of data transmitted through a visible light signal by checking for an occurrence of an error in a packet received from a transmitting terminal, and emitting and expressing the occurrence of the error with various colors through a combination of RGB colors and a visible light communication.

A visible light communication apparatus according to an aspect of the present invention includes: a target signal receiver filtering only a signal having a target wavelength from a visible light received signal received from a transmitting terminal; a signal generator judging a reception quality of the visible light received signal by using characteristics of the signal having the target wavelength and generating a visible signal by using at least one light source having a wavelength different from the target wavelength in accordance with the reception quality; and an optical signal transmitter transmitting the signal having the target wavelength for transmitting data together with the visible signal and changing a light emitting color of a visible light transmitted signal.

In particular, the visible light communication apparatus further includes a frame error processor detecting a bit error for a data frame of the signal having the target wavelength, wherein the signal generator calculates a bit error rate of the data frame by using information on the bit error detected by the frame error processor and judges the reception quality of the visible light received signal on the basis of the calculated bit error rate.

Further, the frame error processor includes: a bit error detecting unit detecting a bit error for a data frame of the visible light received signal; and a restoration-or-not judging unit registering packet error information of the data frame by judging whether the bit error of the data frame is restorable based on the detected bit error information.

The signal generator includes a packet reception information storing unit storing the bit error information detected by the bit error detecting unit and the packet error information of the data frame.

In addition, the frame error processor further includes a bit error restoring unit restoring the bit error of the data frame in accordance with the judgment result of the restoration-or-not judging unit.

Moreover, the signal generator generates the visible signal by using a blue light source and a green light source.

The signal generator generates the visible signal by differentiating light emitting rates of the blue light source and the green light source depending on the reception quality of the visible light received signal.

The light emission rates of the blue light source and the green light source are determined depending on a predetermined value or a user input value.

The target signal receiver receives only a red light signal from the transmitting terminal by using a red filter.

The optical signal transmitter includes: a blue light emitting diode emitting blue light; a green light emitting diode emitting green light; and a red light emitting diode transmitting data to the transmitting terminal by using red light.

Meanwhile, a method of changing a visible light communication light emitting color according to another aspect of the present invention includes: filtering only a signal having a target wavelength from a visible light received signal received from a transmitting terminal; judging a reception quality of the visible light received signal by using characteristics of the signal having the target wavelength; generating a visible signal by using at least one light source having a wavelength different from the target wavelength depending on the reception quality; and changing a light emitting color of a visible light transmitted signal by transmitting the signal having the target wavelength for transmitting data together with the visible signal.

In particular, the judging a reception quality of the visible light received signal by using characteristics of the signal having the target wavelength includes: detecting a bit error for a data frame of the signal having the target wavelength; calculating a bit error rate of the data frame by using the detected bit error information; and judging the reception quality of the visible light received signal on the basis of the calculated bit error rate.

Further, the calculating a bit error rate of the data frame by using the detected bit error information includes: judging whether or not the bit error of the data frame is restorable using the detected bite error information; and restoring the bit error of the data frame in accordance with the judgment result.

In addition, the generating a visible signal generates the visible signal by using a blue light source and a green light source.

Moreover, the generating a visible signal generates the visible signal by differentiating light emitting rates of the blue light source and the green light source depending on the reception quality of the visible light received signal.

The filtering only a signal having a target wavelength receives only a red light signal from the transmitting terminal by using a red filter.

Meanwhile, a method of changing a visible light communication light emitting color according to yet another embodiment of the present invention includes: filtering only a signal having a target wavelength from a visible light received signal received from a transmitting terminal; detecting a bit error for a data frame of the filtered signal; registering packet error information of the data frame by judging whether the bit error of the data frame is restorable based on the detected bit error information; calculating a bit error rate and a packet error rate of the data frame by using the bit error information and the packet error information; judging a reception quality of the visible light received signal on the basis of the calculated bit error rate and packet error rate; generating a visible signal by using at least one light source in accordance with the reception quality; and changing a light emitting color of by a visible light transmitted signal by transmitting the signal having the target wavelength for transmitting data together with the visible signal.

In particular, the generating a visible signal generates the visible signal by differentiating light emitting rates of the blue light source and the green light source depending on the reception quality of the visible light received signal.

Further, the registering packet error information of the data frame registers that there is no error in a corresponding packet of the data frame when the bit error of the data frame is restorable.

In addition, the filtering only a signal having a target wavelength receives only a red light signal from the transmitting terminal by using a red filter.

According to an embodiment of the present invention, the following effects can be expected.

In a visible light communication system constituted by a transmitting side and a receiving side, there is an effect to allow a user to recognize a current communication quality as a color. More specifically, there is an effect to allow a user to intuitively verify a reception quality of data transmitted through a visible light signal by checking for an occurrence of an error in a packet received from a transmitting terminal, and emitting and expressing the occurrence of the error with various colors through a combination of RGB colors.

Further, there is an effect to allow a user to recognize a current communication quality and rapidly and stably transmit data through various RGB combination colors acquired by a combination of colors of optical signals by transmitting data by using only a red light signal having excellent data transmission rate and at this time and generating a visible signal having different light emitting colors by using a green light signal and a blue light signal depending on a reception quality.

DETAILED DESCRIPTION OF THE PREFERRED EMBODIMENTS

Hereinafter, the present invention will be described in detail with reference to the accompanying drawings. Herein, the detailed description of a related known function or configuration that may make the purpose of the present invention unnecessarily ambiguous in describing the present invention will be omitted. Embodiments of the present invention are provided so that those skilled in the art may more completely understand the present invention. Accordingly, the shape, the size, etc., of elements in the figures may be exaggerated for explicit comprehension.

Figure 1:
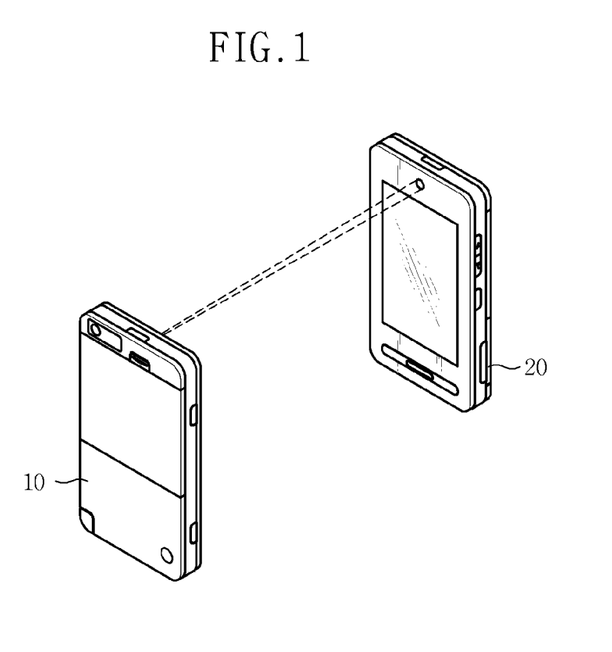
FIG. 1 is an exemplary diagram showing a visible light communication between terminals to which a visible light communication apparatus can be applied according to an embodiment of the present invention.

FIG. 1 is an exemplary diagram showing a visible light communication between terminals to which a visible light communication apparatus can be applied according to an embodiment of the present invention.

Referring to FIG. 1, a visible light communication terminal 10 for visible light communications transmits desired data to a visible light communication terminal 20 through a visible light signal by driving a light emitting diode element. At this time, the visible light communication apparatus 20 receives the visible light signal transmitted from the visible light communication apparatus 10 by using a visible light receiving unit (i.e., camera, photodiode, etc.).

Figure 2:
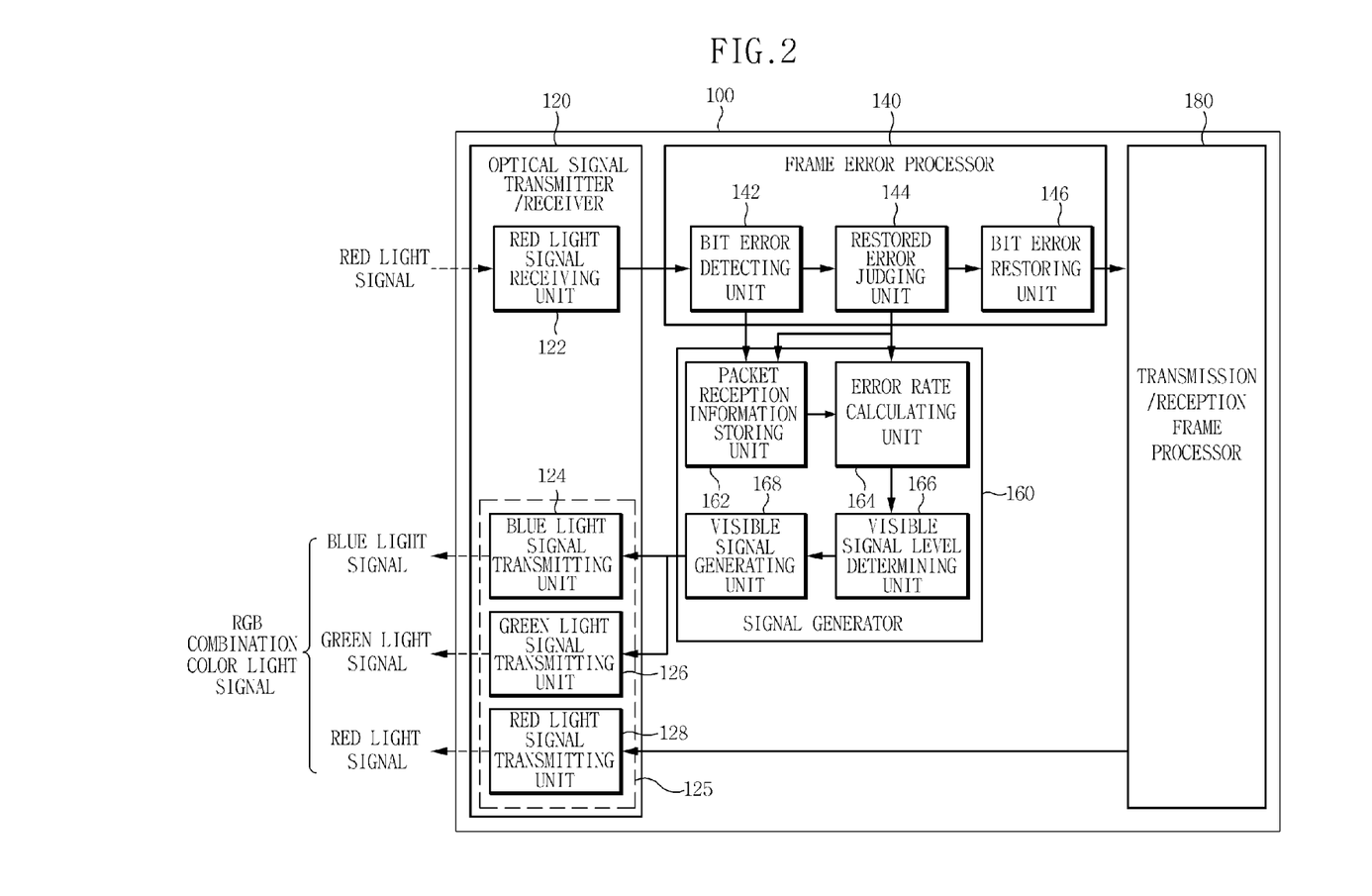
FIG. 2 is a block diagram for describing a visible light communication apparatus according to an embodiment of the present invention.

FIG. 2 is a block diagram for describing a visible light communication apparatus according to an embodiment of the present invention.

Referring to FIG. 2, the visible light communication apparatus according to the embodiment of the present invention includes an optical signal transmitter/receiver 120, a frame error processer 140, a signal generator 160, and a transmission/reception frame processer 180.

First, the optical signal transmitter/receiver 120 receives the visible light signal transmitted from a transmitting terminal (not shown) and filters only a signal having a target wavelength from the received visible light received signal. Further, the optical signal transmitter/receiver 120 transmits the signal having the target wavelength for transmitting data to the transmitting terminal together with a visible signal generated using at least one light source.

For this, the optical signal transmitter/receiver 120 includes a red light signal receiving unit 122 and an optical signal transmitting unit 125.

The red light signal receiving unit 122 filters and receives only a red light signal (signal having the target wavelength) among visible light signals transmitted from the transmitting terminal by using a red filter. At this time, the visible light signal transmitted from the transmitting terminal basically includes the red light signal for transmitting a data frame and in addition, the visible light signal may further include an optical signal having a color other than a red color (i.e., RGB combination color). Meanwhile, the red light signal receiving unit 122 corresponds to a 'target signal receiving unit' disclosed in the appended claims.

The optical signal transmitting unit 125 includes a blue light signal transmitting unit 124, a green light signal transmitting unit 126, and a red light signal transmitting unit 125.

The blue light signal transmitting unit 124 and the green light signal transmitting unit 126 may be implemented by a blue LED (light emitting diode element) and a green LED and generates the visible signal in accordance with the control of the signal generator 160. At this time, the blue light signal transmitting unit 124 and the green light signal transmitting unit 126 generates visible signals with different light emitting rates under the control of the signal generator 160 depending on a reception quality of the visible light received signal received from the transmitting terminal.

The red light signal transmitting unit 125 receives the data frame transmitted to the transmitting terminal from the transmission/reception frame processor 180 and transmits the received data frame to the transmitting terminal by using the red light signal.

That is, the optical signal transmitting unit 125 according to the embodiment of the present invention generates a visible light signal having an RGB combination color acquired by a combination of colors of a green light signal, a blue light signal, and a red light signal and transmits the data frame to the transmitting terminal and at the same time, indicates the reception quality of the visible light signal received from the transmitting terminal by using the RGB combination color.

For example, as the RGB combination color is close to a green color, the RGB combination color indicates that the current reception quality of the visible light signal received from the transmitting terminal is good and as the RGB combination color is close to a red color, the RGB combination color indicates that the current reception quality of the visible light signal received from the transmitting terminal is bad. Of course, it may be changed according to user settings and a color indicating the current reception quality of the visible light signal is not limited to a predetermined color.

The frame error processor 140 receives the filtered red light signal from the red light signal receiving unit 122 and detects a bit error for a data frame of the red light signal. Further, the frame error processor 140 judges whether or not the bit error of the data frame is restored based on the detected bit error information. In this case, when the error of the data frame can be restored, the frame error processor 140 restores the bit error and transfers the restored data frame to the transmission/reception frame processor 180.

More specifically, the frame error processor 140 includes a bit error detecting unit 142, a restored error judging unit 144, and a bit error restoring unit 146.

The bit error detecting unit 142 detects a bit error of a reception packet included in the data frame of the signal (red light signal) having the target wavelength. In addition, the bit error detecting unit 142 transfers information on the detected bit error of the reception packet to the restored error judging unit 144. Further, the bit error detecting unit 142 stores the information on the detected bit error of the reception packet in a packet reception information storing unit 162 of the signal generator 160.

The restored error judging unit 144 receives the bit error information for the data frame received from the bit error detecting unit 142 and judges whether or not the generated bit error is restorable. According to the judgment result in the restored error judging unit 144, when the bit error is restorable, the restored error judging unit 144 transfers the received data frame to the bit error restoring unit 146 and processes the generated bit error to be restored.

Further, when the bit error generated in the reception packet of the received data frame is restorable, the restored error judging unit 144 registers information that there is no error in the corresponding packet in the packet reception information storing unit 162. However, if restoring the bit error generated in the reception packet is impossible, the restored error judging unit 144 registers irrestorable information of the corresponding packet (that is, packet error information) in the packet reception information storing unit 162.

When the bit error of the received packet is restorable according to the judgment result of the restored error judging unit 144, the bit error restoring unit 146 restores the bit error of the corresponding packet and transfers the restored packet to the transmission/reception frame processor 180. Therefore, the transmission/reception frame processor 180 processes packet in accordance with a series of data processing procedures to enable a data communication between the visible light communication apparatuses. Meanwhile, judgment of restoration or not and restoration of the bit error in the restored error judging unit 144 and the bit error restoring unit 146, respectively may be performed per packet.

The signal generator 160 judges the reception quality of the visible light received signal by characteristics of the red light signal received through the red light signal receiving unit 122 and generates the visible light signal by using at least one light source having a wavelength different from the target wavelength according to the reception quality.

More specifically, the signal generator 160 includes the packet reception information storing unit 162, an error rate calculating unit 164, a visible signal level determining unit 166, and a visible signal generating unit 168.

The packet reception information storing unit 162 stores the bit error information and the packet error information generated in the data frame received from the transmitting terminal. That is, the packet reception information storing unit 162 receives and stores the bit error information from the bit error detecting unit 142 and receives and stores the packet error information from the restored error judging unit 144.

When judgment of restoration for each packet or not in the restored error judging unit 144 is ended, the error rate calculating unit 164 calculates a bit error rate (BER) and a packet error rate (PER) of the received data frame by using the bit error information and the packet error information stored in the packet reception information storing unit 162 and transfers the calculated result to the visible signal level determining unit 166.

The visible signal level determining unit 166 receives the bit error rate information and the packet error rate information received from the error rate calculating unit 164 and determines the level of the visible signal for driving the blue light signal transmitting unit 124 and the green light signal transmitting unit 126 by differentiating the light emission rates, light emitting frequencies, relative ratio between emission and non-emission, etc. of the blue light signal transmitting unit 124 and the green light signal transmitting unit 126 depending on the received bit error rate and packet error rate. Herein, the level of the visible signal of each of the blue light signal transmitting unit 124 and the green light signal transmitting unit 126 depending on the bit error rate and the packet error rate may depend on a predetermined value or a user input value. For example, as the bit error rate and the packet error rate increase and the light emission rate of a blue light source is comparatively higher than that of a green light source and as the bit error rate and the packet error rate decrease and the light emission rate of the blue light source is comparatively lower than that of the green light source.

The visible signal generating unit 168 generates the visible signal by using at least one light source having the wavelength different from the target wavelength in accordance with the level of the visible signal determined by the visible signal level determining unit 166. More specifically, the visible signal generating unit 168 generates the visible signal by using the blue light signal transmitting unit 124 and the green light signal transmitting unit 126 emitting a light source having a wavelength different from a red light source transmitting the data frame to the transmission terminal.

The optical signal transmitting unit 125 transmits the RGB combination color light signal.

For this, the optical signal transmitting unit 125 includes the blue light signal transmitting unit 124, the green light signal transmitting unit 126, and the red light signal transmitting unit 128.

The blue light signal transmitting unit 124 and the green light signal transmitting unit 126 may be implemented by the blue LED emitting blue light and the green LED emitting green light and transmits the visible signal in accordance with the level of the visible signal determined by the visible signal level determining unit 166.

The red light signal transmitting unit 128 receives the data frame to be transmitted from the transmission/reception frame processor 180 and transmits the received data frame by using the red light signal.

That is, the optical signal transmitting unit 125 according to the embodiment of the present invention generates a visible light signal having an RGB combination color acquired by a combination of colors of a green light signal, a blue light signal, and a red light signal and transmits the data frame to the transmitting terminal and at the same time, indicates the reception quality of the visible light signal received from the transmitting terminal by using the RGB combination color.

Figure 3:
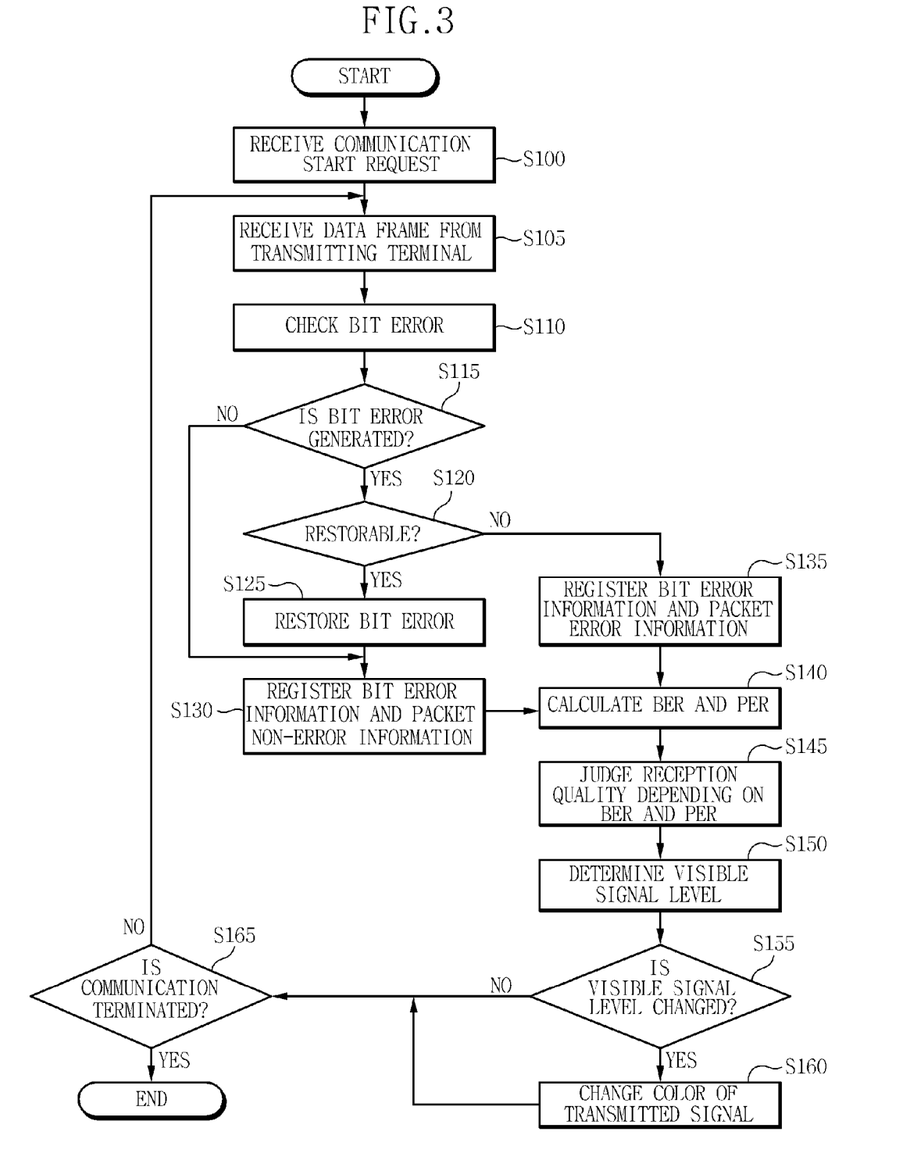
FIG. 3 is a flowchart for describing a method of changing a visible light communication light emitting color according to an embodiment of the present invention.

FIG. 3 is a flowchart for describing a method of changing a visible light communication light emitting color depending on a reception quality in a receiving-side visible light communication apparatus according to an embodiment of the present invention.

Referring to FIG. 3, first, the receiving-side visible light communication apparatus according to the embodiment of the present invention receives a signal requesting a communication start from a transmitting-side visible light communication apparatus (S100).

According to the request of the communication start at step S100, a communication is started and the receiving-side visible light communication apparatus (hereinafter, referred to as 'receiving terminal') according to the embodiment of the present invention receives a data frame through a visible light signal from the transmitting-side visible light communication apparatus (hereinafter, referred to as 'transmitting terminal') (S105). At this time, a receiving terminal filters and receives only a red light signal among visible light signals transmitted from the transmitting terminal by using a red filter. The visible light signal transmitted from the transmitting terminal basically includes the red light signal for transmitting the data frame and in addition, the visible light signal may further include an optical signal having a color other than a red color.

Next, the receiving terminal checks a bit error of the data frame received from the transmitting terminal (S110).

When a bit error is detected through checking the bit error at step S110 (S115), it is judged whether an error of the data frame received from the transmitting terminal is restorable based on information on the detected bit error (S120).

According to the judgment result at step S120, when a bit error generated in a packet of the data frame is restorable, the generated bit error is restored (S125) and the corresponding bit error information and the packet non-error information indicating that the bit error is restored and the packet has no error are registered in a storing means (S130).

However, when the bit error generated in the received packet is irrestorable, the corresponding bit error information and irrestorable information (packet error information) of the corresponding packet are registered in the storing means (S135).

Next, a bit error rate and a packet error rate are calculated using the error information stored in the storing means (S140).

When the bit error rate (BER) and the packet error rate (PER) are calculated through step S140, a reception quality of a red light signal is judged in accordance with the calculated error rate and the level of the visible signal is determined in accordance with the reception quality (S150).

When the level of the visible signal is determined through step S150, it is judged whether the visible signal level is changed from the previous level (S155).

According to the judgment result at step S155, when the level of the visible signal is changed, by differentiating the light emission rates, light emitting frequencies, relative ratio between emission and non-emission, etc. of a green light source and a blue light source depending on the changed level of the visible signal, a visible signal having the corresponding light emitting color is generated (S160). At this time, the visible signal generated at step S160 is transmitted together with the red light signal for transmitting data and is expressed as an RGB combination color and has a light emitting color different from the previous visible signal.

Meanwhile, according to the judgment result at step S155, when the level of the visible signal is not changed, the process proceeds to step S105 and thereafter, a subsequent packet is received and the above procedure is repeated. While the process proceeds to the subsequent packet reception, it is judged whether a communication is terminated (S165) and communication termination or subsequent packet reception is performed.

In the present invention, there is an effect to allow a user to recognize a current communication quality and rapidly and stably transmit data through various RGB combination colors acquired by a combination of colors of optical signals by transmitting data by using only a red light signal having excellent data transmission rate and at this time and generating a visible signal having different light emitting colors by using a green light signal and a blue light signal depending on a reception quality.

Figure 4:
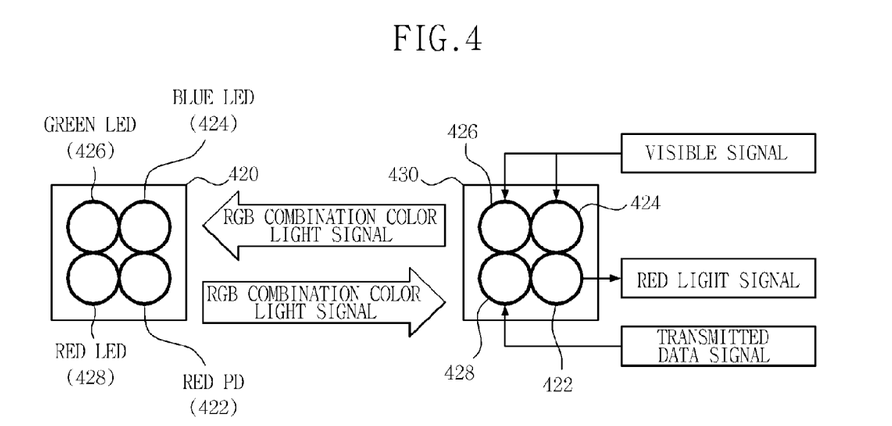
FIGS. 4 and 5 are exemplary diagrams for describing a visible light communication apparatus performing a communication by changing a visible light communication light emitting color depending on a communication quality through a combination of RGB colors.

Referring to FIG. 4, FIG. 4 is an exemplary diagram of a communication method between two visible light communication apparatuses capable of changing a visible color depending on a communication state.

Reference numerals 420 and 430 represent visible light communication elements constituted by a green LED 426, a blue LED 424, a red LED 428, and a red PD 422 filtering a red light signal.

The green LED 426 and the blue LED 424 generate different visible signals depending on a reception quality of a visible light received signal and the red LED 428 for transmitting communication data transmits a data signal. In addition, the red PD 422 filtering a red color receives only a red light signal and outputs a data frame of the received red light signal to be processed at the subsequent stage.

Figure 5:
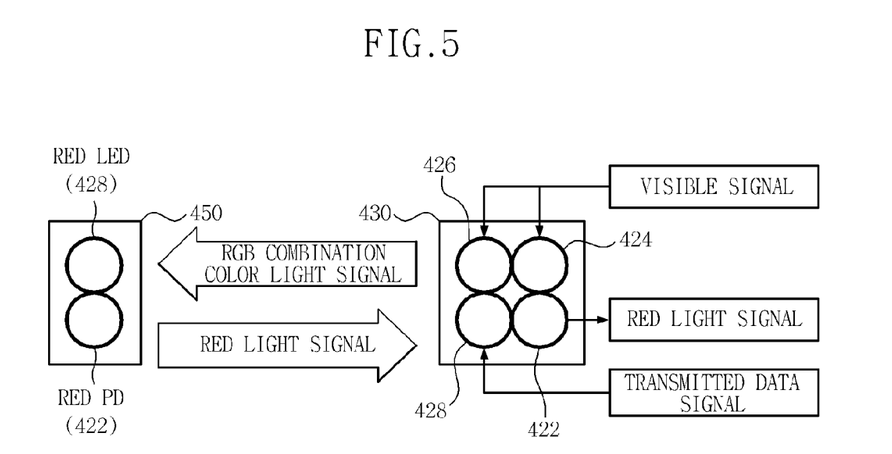

Referring to FIG. 5, FIG. 5 is an exemplary diagram of a communication method between a visible light communication apparatus capable of changing a visible color and a visible light communication apparatus incapable of changing the visible color depending on a communication state.

Reference numeral 450 represents a visible light communication element having only the red LED 428 incapable of generating the visible signal and reference numeral 430 represents a visible light communication element constituted by the green LED 426, the blue LED 424, the red LED 428, and the red PD 422 filtering the red light signal. In FIG. 5, the green LED 426 and the blue LED 424 of reference numeral 430 generate different visible signals depending on the reception quality of the visible light received signal and the red LED 428 for transmitting the communication data transmits the data signal, as shown in FIG. 4. In addition, the red PD 422 filtering the red color receives only the red light signal and outputs the data frame of the received red light signal to be processed at the subsequent stage.

On the contrary, reference numeral 450 represents a visible light communication element including only the red LED 428 and the red PD 422. The red LED 428 transmits the data signal and the red PD 422 receives only the red light signal. That is, only a visible light communication apparatus using the element represented by reference numeral 430 can change the color depending on the communication state.

According to the above-mentioned present invention, there is an effect to allow a user to intuitively verify a reception quality of data transmitted through a visible light signal by checking for an occurrence of an error in a packet received from a transmitting terminal, and emitting and expressing the occurrence of the error with various colors through a combination of RGB colors.

As described above, the preferred embodiments have been described and illustrated in the drawings and the description. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A visible light communication apparatus, comprising:
a target signal receiver filtering only a signal having a target wavelength from a visible light received signal received from a transmitting terminal;
a signal generator judging a reception quality of the visible light received signal by using characteristics of the signal having the target wavelength and generating a visible signal by using at least one light source having a wavelength different from the target wavelength in accordance with the reception quality; and
an optical signal transmitter transmitting the signal having the target wavelength for transmitting data together with the visible signal and changing a light emitting color of a visible light transmitted signal.

2. The visible light communication apparatus of claim 1, further comprising:
a frame error processor detecting a bit error for a data frame of the signal having the target wavelength,
wherein the signal generator calculates a bit error rate of the data frame by using information on the bit error detected by the frame error processor and judges the reception quality of the visible light received signal on the basis of the calculated bit error rate.

3. The visible light communication apparatus of claim 2, wherein the frame error processor includes:
a bit error detecting unit detecting a bit error for a data frame of the visible light received signal; and a restoration-or-not judging unit registering packet error information of the data frame by judging whether the bit error of the data frame is restorable based on the detected bit error information.

4. The visible light communication apparatus of claim 3, wherein the signal generator includes a packet reception information storing unit storing the bit error information detected by the bit error detecting unit and the packet error information of the data frame.

5. The visible light communication apparatus of claim 3, wherein the frame error processor further includes a bit error restoring unit restoring the bit error of the data frame in accordance with the judgment result of the restoration-or-not judging unit.

6. The visible light communication apparatus of claim 1, wherein the signal generator generates the visible signal by using a blue light source and a green light source.

7. The visible light communication apparatus of claim 6, wherein the signal generator generates the visible signal by differentiating light emitting rates of the blue light source and the green light source depending on the reception quality of the visible light received signal.

8. The visible light communication apparatus of claim 7, wherein, the light emission rates of the blue light source and the green light source are determined depending on a predetermined value or a user input value.

9. The visible light communication apparatus of claim 1, wherein the target signal receiver receives only a red light signal from the transmitting terminal by using a red filter.

10. The visible light communication apparatus of claim 1, wherein the optical signal transmitter includes:
  a blue light emitting diode emitting blue light;
  a green light emitting diode emitting green light; and
  a red light emitting diode transmitting data to the transmitting terminal by using red light.

11. A method of changing a visible light communication light emitting color, comprising:
  filtering only a signal having a target wavelength from a visible light received signal received from a transmitting terminal;
  judging a reception quality of the visible light received signal by using characteristics of the signal having the target wavelength;
  generating a visible signal by using at least one light source having a wavelength different from the target wavelength depending on the reception quality; and
  changing a light emitting color of a visible light transmitted signal by transmitting the signal having the target wavelength for transmitting data together with the visible signal.

12. The method of changing a visible light communication light emitting color of claim 11, wherein the judging a reception quality of the visible light received signal by using characteristics of the signal having the target wavelength includes:
  detecting a bit error for a data frame of the signal having the target wavelength;
  calculating a bit error rate of the data frame by using the detected bit error information; and
  judging the reception quality of the visible light received signal on the basis of the calculated bit error rate.

13. The method of changing a visible light communication light emitting color of claim 12, wherein the calculating a bit error rate of the data frame by using the detected bit error information includes:
  judging whether or not the bit error of the data frame is restorable using the detected bite error information; and
  restoring the bit error of the data frame in accordance with the judgment result.

14. The method of changing a visible light communication light emitting color of claim 11, wherein the generating a visible signal generates the visible signal by using a blue light source and a green light source.

15. The method of changing a visible light communication light emitting color of claim 13, wherein the generating a visible signal generates the visible signal by differentiating light emitting rates of the blue light source and the green light source depending on the reception quality of the visible light received signal.

16. The method of changing a visible light communication light emitting color of claim 13, wherein the filtering only a signal having a target wavelength receives only a red light signal from the transmitting terminal by using a red filter.

* * * * *